(12) United States Patent
Murphy et al.

(10) Patent No.: US 7,664,819 B2
(45) Date of Patent: Feb. 16, 2010

(54) INCREMENTAL ANTI-SPAM LOOKUP AND UPDATE SERVICE

(75) Inventors: Elissa E. Murphy, Seattle, WA (US); Joshua T Goodman, Redmond, WA (US); Derek M Hazeur, Redmond, WA (US); Robert L Rounthwaite, Fall City, WA (US); Geoffrey J Hulten, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 808 days.

(21) Appl. No.: 10/879,626

(22) Filed: Jun. 29, 2004

(65) Prior Publication Data

US 2006/0015561 A1    Jan. 19, 2006

(51) Int. Cl.
G06F 12/16 (2006.01)
G06F 15/16 (2006.01)

(52) U.S. Cl. .......................... 709/206; 709/219; 726/22

(58) Field of Classification Search ......... 709/204–207, 709/217–219; 707/1–10; 726/45, 22, 23
See application file for complete search history.

(56) References Cited

U.S. PATENT DOCUMENTS

| | | |
|---|---|---|
| 5,377,354 A | 12/1994 | Scannell et al. |
| 5,619,648 A | 4/1997 | Canale et al. |
| 5,638,487 A | 6/1997 | Chigier |
| 5,704,017 A | 12/1997 | Heckerman et al. |
| 5,805,801 A | 9/1998 | Holloway et al. |
| 5,835,087 A | 11/1998 | Herz et al. |
| 5,884,033 A | 3/1999 | Duvall et al. |
| 5,905,859 A | 5/1999 | Holloway et al. |

(Continued)

FOREIGN PATENT DOCUMENTS

EP    413 537    2/1991

(Continued)

OTHER PUBLICATIONS

Ion Androutsopoulos, et al., An Experimental Comparison of Naive Bayesian and Keyword-Based Anti-Spam Filtering with Personal E-mail Messages, SIGIR 2000, 2000, pp. 160-167, ACM, Athens, Greece.

(Continued)

*Primary Examiner*—Benjamin R Bruckart
(74) *Attorney, Agent, or Firm*—Shook, Hardy & Bacon LLP

(57) ABSTRACT

The present invention provides a unique system and method that facilitates incrementally updating spam filters in near real time or real time. Incremental updates can be generated in part by difference learning. Difference learning involves training a new spam filter based on new data and then looking for the differences between the new spam filter and the existing spam filter. Differences can be determined at least in part by comparing the absolute values of parameter changes (weight changes of a feature between the two filters). Other factors such as frequency of parameters can be employed as well. In addition, available updates with respect to particular features or messages can be looked up using one or more lookup tables or databases. When incremental and/or feature-specific updates are available, they can be downloaded such as by a client for example. Incremental updates can be automatically provided or can be provided by request according to client or server preferences.

41 Claims, 9 Drawing Sheets

U.S. PATENT DOCUMENTS

| | | | |
|---|---|---|---|
| 6,003,027 A | 12/1999 | Prager | |
| 6,023,723 A | 2/2000 | McCormick et al. | |
| 6,041,321 A | 3/2000 | Earl et al. | |
| 6,047,242 A | 4/2000 | Benson | |
| 6,052,709 A | 4/2000 | Paul | |
| 6,072,942 A | 6/2000 | Stockwell et al. | |
| 6,074,942 A | 6/2000 | Stockwell et al. | |
| 6,101,531 A | 8/2000 | Eggleston et al. | |
| 6,112,227 A * | 8/2000 | Heiner | 709/203 |
| 6,122,657 A | 9/2000 | Hoffman, Jr. et al. | |
| 6,161,130 A | 12/2000 | Horvitz et al. | |
| 6,167,434 A | 12/2000 | Pang | |
| 6,192,360 B1 | 2/2001 | Dumais et al. | |
| 6,199,102 B1 | 3/2001 | Cobb | |
| 6,266,692 B1 | 7/2001 | Greenstein | |
| 6,308,273 B1 | 10/2001 | Goertzel et al. | |
| 6,314,421 B1 | 11/2001 | Sharnoff et al. | |
| 6,321,267 B1 | 11/2001 | Donaldson | |
| 6,327,617 B1 | 12/2001 | Fawcett et al. | |
| 6,330,590 B1 | 12/2001 | Cotten | |
| 6,351,740 B1 * | 2/2002 | Rabinowitz | 706/22 |
| 6,370,526 B1 | 4/2002 | Agrawal et al. | |
| 6,393,465 B2 | 5/2002 | Leeds | |
| 6,421,709 B1 * | 7/2002 | McCormick et al. | 709/206 |
| 6,424,997 B1 | 7/2002 | Buskirk, Jr. et al. | |
| 6,434,600 B2 | 8/2002 | Waite et al. | |
| 6,453,327 B1 | 9/2002 | Nielsen | |
| 6,477,551 B1 | 11/2002 | Johnson et al. | |
| 6,484,197 B1 | 11/2002 | Donohue | |
| 6,484,261 B1 | 11/2002 | Wiegel | |
| 6,505,250 B2 | 1/2003 | Freund et al. | |
| 6,546,416 B1 | 4/2003 | Krisch | |
| 6,592,627 B1 | 7/2003 | Agrawal et al. | |
| 6,615,242 B1 | 9/2003 | Riemers | |
| 6,633,855 B1 * | 10/2003 | Auvenshine | 706/15 |
| 6,643,686 B1 | 11/2003 | Hall | |
| 6,654,787 B1 * | 11/2003 | Aronson et al. | 709/206 |
| 6,684,201 B1 | 1/2004 | Brill | |
| 6,691,156 B1 | 2/2004 | Drummond et al. | |
| 6,701,350 B1 | 3/2004 | Mitchell | |
| 6,701,440 B1 | 3/2004 | Kim et al. | |
| 6,728,690 B1 | 4/2004 | Meek et al. | |
| 6,732,149 B1 | 5/2004 | Kephart | |
| 6,732,157 B1 | 5/2004 | Gordon et al. | |
| 6,732,273 B1 | 5/2004 | Byers | |
| 6,742,047 B1 | 5/2004 | Tso | |
| 6,748,422 B2 | 6/2004 | Morin et al. | |
| 6,751,348 B2 | 6/2004 | Buzuloiu et al. | |
| 6,757,830 B1 | 6/2004 | Tarbotton et al. | |
| 6,768,991 B2 | 7/2004 | Hearnden | |
| 6,775,704 B1 | 8/2004 | Watson et al. | |
| 6,779,021 B1 * | 8/2004 | Bates et al. | 709/206 |
| 6,785,820 B1 * | 8/2004 | Muttik et al. | 726/24 |
| 6,842,773 B1 | 1/2005 | Ralston et al. | |
| 6,853,749 B2 | 2/2005 | Watanabe et al. | |
| 6,915,334 B1 | 7/2005 | Hall | |
| 6,920,477 B2 * | 7/2005 | Mitzenmacher | 709/203 |
| 6,928,465 B2 | 8/2005 | Earnest | |
| 6,971,023 B1 | 11/2005 | Makinson et al. | |
| 7,003,555 B1 | 2/2006 | Jungck | |
| 7,032,030 B1 | 4/2006 | Codignotto | |
| 7,051,077 B2 | 5/2006 | Lin | |
| 7,117,358 B2 * | 10/2006 | Bandini et al. | 713/153 |
| 7,146,402 B2 | 12/2006 | Kucherawy | |
| 7,155,243 B2 | 12/2006 | Baldwin et al. | |
| 7,155,484 B2 | 12/2006 | Malik | |
| 7,188,369 B2 * | 3/2007 | Ho et al. | 726/24 |
| 7,219,148 B2 * | 5/2007 | Rounthwaite et al. | 709/224 |
| 7,249,162 B2 * | 7/2007 | Rounthwaite et al. | 709/206 |
| 7,263,607 B2 | 8/2007 | Ingerman et al. | |
| 7,293,063 B1 | 11/2007 | Sobel | |
| 7,320,020 B2 | 1/2008 | Chadwick et al. | |
| 7,359,941 B2 | 4/2008 | Doan et al. | |
| 7,366,761 B2 | 4/2008 | Murray et al. | |
| 2001/0046307 A1 | 11/2001 | Wong | |
| 2002/0016956 A1 | 2/2002 | Fawcett et al. | |
| 2002/0059425 A1 | 5/2002 | Belfiore et al. | |
| 2002/0073157 A1 | 6/2002 | Newman et al. | |
| 2002/0091738 A1 | 7/2002 | Rohrabaugh et al. | |
| 2002/0124025 A1 | 9/2002 | Janakiraman et al. | |
| 2002/0129111 A1 | 9/2002 | Cooper | |
| 2002/0147782 A1 | 10/2002 | Dimitrova et al. | |
| 2002/0174185 A1 * | 11/2002 | Rawat et al. | 709/206 |
| 2002/0184315 A1 | 12/2002 | Earnest | |
| 2002/0199095 A1 | 12/2002 | Bandini et al. | |
| 2003/0009495 A1 | 1/2003 | Adjaoute | |
| 2003/0009698 A1 | 1/2003 | Lindeman et al. | |
| 2003/0016872 A1 | 1/2003 | Sun | |
| 2003/0037074 A1 | 2/2003 | Dwork et al. | |
| 2003/0041126 A1 | 2/2003 | Buford et al. | |
| 2003/0088627 A1 | 5/2003 | Rothwell et al. | |
| 2003/0167311 A1 | 9/2003 | Kirsch | |
| 2003/0191969 A1 | 10/2003 | Katsikas | |
| 2003/0204569 A1 | 10/2003 | Andrews et al. | |
| 2003/0320054 | 10/2003 | Cheng et al. | |
| 2003/0229672 A1 | 12/2003 | Kohn | |
| 2004/0003283 A1 | 1/2004 | Goodman et al. | |
| 2004/0015554 A1 | 1/2004 | Wilson | |
| 2004/0019650 A1 * | 1/2004 | Auvenshine | 709/206 |
| 2004/0054887 A1 | 3/2004 | Paulsen et al. | |
| 2004/0073617 A1 | 4/2004 | Milliken et al. | |
| 2004/0083270 A1 | 4/2004 | Heckerman et al. | |
| 2004/0093371 A1 | 5/2004 | Burrows et al. | |
| 2004/0139160 A1 | 7/2004 | Wallace et al. | |
| 2004/0139165 A1 | 7/2004 | McMillan et al. | |
| 2004/0148330 A1 | 7/2004 | Alspector et al. | |
| 2004/0177120 A1 | 9/2004 | Kirsch | |
| 2004/0199585 A1 | 10/2004 | Wang | |
| 2004/0199594 A1 | 10/2004 | Radatti et al. | |
| 2004/0210640 A1 | 10/2004 | Chadwick et al. | |
| 2004/0215977 A1 * | 10/2004 | Goodman et al. | 713/201 |
| 2004/0255122 A1 | 12/2004 | Ingerman et al. | |
| 2004/0260776 A1 * | 12/2004 | Starbuck et al. | 709/206 |
| 2005/0015455 A1 | 1/2005 | Liu | |
| 2005/0050150 A1 | 3/2005 | Dinkin | |
| 2005/0076084 A1 | 4/2005 | Loughmiller et al. | |
| 2005/0080855 A1 | 4/2005 | Murray | |
| 2005/0080889 A1 | 4/2005 | Malik et al. | |
| 2005/0091321 A1 | 4/2005 | Daniell et al. | |
| 2005/0097174 A1 | 5/2005 | Daniell | |
| 2005/0102366 A1 * | 5/2005 | Kirsch | 709/207 |
| 2005/0114452 A1 | 5/2005 | Prakash | |
| 2005/0120019 A1 | 6/2005 | Rigoutsos et al. | |
| 2005/0159136 A1 | 7/2005 | Rouse et al. | |
| 2005/0160148 A1 | 7/2005 | Yu | |
| 2005/0165895 A1 | 7/2005 | Rajan et al. | |
| 2005/0182735 A1 | 8/2005 | Zager et al. | |
| 2005/0188023 A1 | 8/2005 | Doan et al. | |
| 2005/0204159 A1 | 9/2005 | Davis et al. | |
| 2005/0228899 A1 | 10/2005 | Wendkos et al. | |
| 2006/0031303 A1 * | 2/2006 | Pang | 709/206 |
| 2006/0031306 A1 | 2/2006 | Haverkos | |
| 2006/0036701 A1 | 2/2006 | Bulfer et al. | |
| 2006/0123083 A1 | 6/2006 | Goutte et al. | |
| 2006/0265498 A1 * | 11/2006 | Turgeman et al. | 709/225 |
| 2007/0101423 A1 | 5/2007 | Oliver et al. | |
| 2007/0130350 A1 | 6/2007 | Alperovitch et al. | |
| 2007/0130351 A1 | 6/2007 | Alperovitch et al. | |
| 2007/0133034 A1 | 6/2007 | Jindal et al. | |
| 2008/0104186 A1 | 5/2008 | Wieneke et al. | |

FOREIGN PATENT DOCUMENTS

| | | |
|---|---|---|
| EP | 720 333 | 7/1996 |

| | | |
|---|---|---|
| EP | 1376427 | 3/2003 |
| EP | 1376427 A2 | 1/2004 |
| EP | 1376427 A3 | 1/2004 |
| WO | WO 96/35994 | 11/1996 |
| WO | 9967731 | 12/1999 |
| WO | WO 02/071286 | 9/2002 |
| WO | WO 2004/059506 | 7/2004 |
| WO | WO 2004/059605 | 7/2004 |

OTHER PUBLICATIONS

Tom Fawcett, "In Vivo" Spam Filtering: A Challenge Problem for KDD, SIGKDD Explorations, Dec. 2003, pp. 140-148, vol. 5 Iss. 2, ACM.

Lorrie Faith Cranor, et al., Spam!, Communications of the ACM, Aug. 1998, pp. 74-83, vol. 41 No. 8, ACM.

Jose Maria Gomez Hidalgo, Evaluating Cost-Sensitive Unsolicited Bulk Email Categorization, SAC 2002, 2002, pp. 615-620, ACM, Madrid, Spain.

Kevin R. Gee, Using Latent Semantic Indexing to Filter Spam, SAC 2003, 2003, pp. 460-464, ACM, Melbourne, Florida, USA.

Cynthia Dwork, et al.; "Pricing Via Processing or Combatting Junk Mail"; Presented at Crypto '92; pp. 1-11.

Thorsten Joachims; "Text Categorization with Support Vector Machines: Learning with Many Relevant Features"; LS-8 Report Nov. 23, 1997, 18 pages.

Daphne koller, et al.; "Hierarchically Classifying Doucments Using Very Few Words"; In ICML-97: Proceedings of the Fourteenth International Conference on Machine Learning; San Francisco, CA: Morgan Kaufmann 1997; 9 pages.

Ellen Spertus; "Smokey: Automatic Recognition of Hostile Messages"; Proceedings of the Conference on Innovative Applications in Artificial Intelligence (IAAI), 1997, 8 pages.

Hinrich Schutze, et al.; "A Comparison of Classifiers and Document Representations for the Routing Problem"; Proceedings of the 18th Annual International ACM SIGIR Conference on Research and Development in Information Retrieval, Seattle, WA, Jul. 9-13, 1995; pp. 229-237.

David D. Lewis, et al.; "A Comparison of Two Learning Algorithms for Text Categorization"; Third Annual Symposium on Document Analysis and Information Retrieval; Apr. 11-13, 1994; pp. 81-93.

Mehran Sahami; "Learning Limited Dependence Bayesian Classifiers"; In KDD-96: Proceedings of the Second International Conference on Knowledge Discovery and Data Mining; AAAI Press, 1996; Menlo Park, CA; pp. 335-338.

William W. Cohen; "Learning Rules that Classify E-Mail"; In the Proceedings of the 1996 AAAI Spring Symposium on Machine Learning in Information Access. Downloaded from William Cohen's web page: http://www.research.att.com/nwcohen/pubs.html.

Iwayama Makoto, et al., Hierarchical Bayesian Clustering for Automatic Text Classification, Natural Language, 1995, pp. 1322-1327.

David D. Lewis, An Evaluation of Phrasal and Clustered Representations on a Text Categorization Task, 15th Annual International SIGIR '92, Denmark 1992, pp. 37-50.

Daphne Koller, et al, Toward Optimal Feature Selection, Machine Learning Proc. of the Thirteenth International Conference, Morgan Kaufmann, 1996, 9 pages.

David Dolan Lewis, Representaion and Learning in Information Retrieval, University of Massachusetts, 1992.

Y. H. Li, et al., Classification of Text Documents, The Computer Journal, vol. 41, No. 8, 1998; pp. 537-546.

Juha Takkinen, et al., CAFE: A Conceptual Model for Managing Information in Electronic Mail, Laboratory for Intelligent Information Systems, Department of Computer and Information Science, Linkoping University, Sweden, Conference on System Sciences, 1998 IEEE.

Jacob Palme, et al., Issues When Designing Filters In Messaging Systems, Computer Communications, 1996, pp. 95-101, Stockholm, Sweden.

Richard B. Segal, et al., SwiftFile: An Intelligent Assistant for Organizing E-Mail, In Proceedings of the Third International Conference on Autonomous Agents, May 1999, 7 pages.

Mehran Sahami, et al., A Bayesian Approach to Filtering Junk E-Mail, AAAI Workshop on Learning for Text Categorization, Jul. 1998, 8 pages, Madison, Wisconsin, USA.

David Madigan, Statistics and The War on Spam, Rutgers University, pp. 1-13, 2003.

Padraig Cunningham, et al., A Case-Based Approach to Spam Filtering that Can Track Concept Drift, In The ICCBR'03 Workshop on Long-Lived CBR Systems, Jun. 2003, 9 pages, Trondheim, Norway.

Mark Rosen, E-mail Classification in the Haystack Framework, Massachusetts Institute of Technology, Feb. 2003, 103 pages.

Thorsten Joachims, Transductive Inference for Text Classification Using Support Vector Machines, In Proceedings of the 16th International Conference on Machine Learning, 1999, pp. 200-209, San Francisco, California, USA.

John Wong, Preventing Spams and Relays, Linux Journal, Dec. 1998, 6 pages, vol. 1998, Issue 56es, Specialized Systems Consultants, Inc.

Meng Weng Wong, SPF Overview, Linux Journal, Apr. 2004, 6 pages, Vol. 2004 Issue 120, Specialized Systems Consultants, Inc.

Stop, in the Name of Spam, Communications of the ACM, Nov. 1998, pp. 11-14, vol. 41, No. 11.

Eric Allman, Spam, Spam, Spam, Spam, Spam, the FTC, and Spam, Queue, Sep. 2003, pp. 62-69, vol. 1 Issue 6.

Patrick Pantel, et al., SpamCop: A Spam Classification & Organization Program, In Proc. AAAI-1998 Workshop on Learning for Text Categorization, 1998, 8 pages.

J.D.M. Rennie. ifile: An Application of Machine Learning to E-Mail Filtering, Proceedings of the KDD-2000 Workshop on Text Mining, Sixth ACM SIGKDD International Conference on Knowledge Discovery and Data Mining, 2000. 6 pages.

S. Argamon, et al., Routing documents according to style, In First International Workshop on Innovative Information Systems, 1998, 8 pages.

K. Mock, An Experimental Framework for Emal Categorization and Management, Proceedings of the 24th Annual International ACM SIGIR Conference, 2001, pp. 392-393.

Giuseppe Manco, et al., Towards an Adaptive Mail Classifier, In Proc. of Italian Association for Artificial Intelligence Workshop, 2002, 12 pages.

A.Z. Broder, et al. Syntactic Clustering of the Web, SRC Technical Note, Digital Corporation, Jul. 25, 1997, 13 pages.

Fabrizio Sebastiani, Machine Learning in Automated Text Categorization, ACM Computing Surveys, 2002, pp. 1-47, vol. 34-Issue 1.

I. Androutsopoulos, et al., Learning to Filter Spam E-mail: A Comparison of a Naive Bayesian and a Memory-based Approach, 4th PKDD's Workshop on Machine Learning and Textual Information Access, 2000, 13 pages.

D. Turner et al., Payment-based Email, 5th International Conference on Software Engineering, Artificial Intelligence, Networking, and Parallel/Distributed Computing, Jun. 2004, 7 pages.

Cormac O'Brien, et al., Spam Filters: Bayes vs. Chi-squared; Letters vs. Words, Proceedings of the 1st international symposium on Information and communication technologies, 2003, pp. 291-296, Dublin, Ireland.

Olle Balter, et al., Bifrost Inbox Organizer: Giving users control over the inbox, NordiCHI Oct. 2, 2002, pp. 111-118, Arhus, Denmark.

D.A. Turner et al., Controlling Spam through Lightweight Currency, In Proc. of the Hawaii International Conference on Computer Sciences, Jan. 2004, 9 pages.

P.Y. Simard, et al., Using Character Recognition and Segmentation to Tell Computer from Humans, International Conference on Document Analysis and Recogntion (ICDAR), IEEE Computer Society, 2000, pp. 418-423.

S. Li et al., Secure Human-Computer Identification against Peeping: A Survery, Microsoft Research, 2003, 53 pages.

European Search Report, EP31087TE900, mailed Nov. 11, 2004.

J. Byrne, My Spamblock, Google, Jan. 19, 1997, 2 pages.

D. F. Skoll, How to Make Sure a Human is Sending You Mail, Google, Nov. 17, 1996, 2 pages.

L. M. Bowman, Hotmail Spam Filters Block Outgoing E-Mail, CNET News.com, Jan. 18, 2001, 3 pages.

Yu Wu, et al., A New Anti-Spam Filter Based on Data Mining and Analysis of Email Security, Conference Proceedings of the SPIE, Data Mining and Knowledge Discovery Theory, Tools and Technology V, vol. 5098, Apr. 21, 2003, pp. 147-154, Orlando, FL, USA.

Massey, B., et al., Learning Spam: Simple Techniques for Freely-Available Software, Proceedings of Freenix Track 2003 Usenix Annual Technical Conference, Online!, Jun. 9, 2003, pp. 63-76, Berkley, CA, USA.

Graham, P., The Future of Spam, Computer Security Journal, CSI Computer Security Institute, vol. 19, No. 1, Jan. 2003, pp. 1-5.

Graham, P., A Plan for Spam, Online!, Aug. 2002, XP002273602, http://www.paulgraham.com/spam.html, retrieved on Mar. 12, 2004.

Partial European Search Report, EP33823TE900kap, mailed Jun. 21, 2005.

U.S. Appl. No. 09/497,992, filed Feb. 4, 2000, Maller.
U.S. Appl. No. 10/180,565, filed Jun. 26, 2002, Goodman.
U.S. Appl. No. 10/291,260, filed Nov. 8, 2002, Burrows.
U.S. Appl. No. 10/208,150, filed Jul. 29, 2002, Andaker.
U.S. Appl. No. 09/893,941, filed Jun. 28, 2001, Horvitz.
U.S. Appl. No. 10/278,591, filed Oct. 23, 2002, Heckerman.

Breiman, Friedman, Olshen, and Stone. "Classification and Regression Trees." Wadsworth & Brooks, Monterey, CA (1984).

Quinlan. "C4.5: Programs for Machine Learning." Morgan Kaufmann, San Francisco, CA (1993).

European Search Report, dated Jun. 9, 2005, mailed Aug. 22, 2005 for European Patent Application Serial No. EP04011978, 12 pages.

Written Opinion of the International Preliminary Examining Authority mailed Nov. 30, 2005 for PCT/US03/41526, 5 pages.

International Search Report dated Jan. 17, 2006, mailed Jan. 31, 2006, for PCT Application Serial No. PCT/US04/05501, 2 pages.

European Search Report dated Apr. 6, 2006 and mailed Apr. 6, 2006 for EP 04102242, 3 pages.

Graham. "The Future of SPAM" (2003) Computer Journal, CSI Computer Security Institute, vol. 19, No. 1, 6 pages.

European Search Report dated Feb. 23, 2007, mailed Feb. 28, 2007 for European Patent Application Serial No. 05105308, 4 pages.

European Search Report dated Jul. 5, 2006, mailed Jul. 24, 2006 for European Application No. EP 06 01 2631, 3 pages.

Federal Trade Commission. "False Claims in Spam", A report by the FTC's division of marketing practices, Apr. 30, 2003, http://www.ftc.gov/reports/spam/030429spamreport.pdf.

Hansell. "Internet is losing ground in battle against spam", The New York Times: Technology section, Apr. 22, 2003, 2003.

"MIME", The Microsoft Computer Dictionary. 5th ed. Redmond, WA; Microsoft Press. May 1, 2002.

Ron White, How Computers Work, 2004, QUE Publishing, pp. 238-239.

Michael S. Mimoso, "Quick Takes: Image Analysis, Filtering Comes to E-mail Security", http://searchsecurity.techtarget.com/originalContent.html (Feb. 5, 2002).

"Clearswift Announces the Most Complete e-Policy-Based Email Content Security Product for Service Providers", http://www.clearswift.com/news/item.aspx?ID=144. (Oct. 12, 2002).

OA dated Oct. 8, 2008 for U.S. Appl. No. 11/743,466, 43 pages.
OA dated Nov. 28, 2008 for U.S. Appl. No. 10/799,455, 53 pages.
OA dated Nov. 6, 2008 for U.S. Appl. No. 10/799,992, 46 pages.
OA dated Jan. 16, 2009 for U.S. Appl. No. 10/917,077, 34 pages.

Tom Mitchell, Machine Learning, (McGraw Hill), 1997, Chapter 6, pp. 180-184.

Yang, Y., Pedersen, J.P., "A comparative Study on Feature Selection in Text Categorization," Proceedings of the Fourteenth International Conference on Machine Learning (ICML 1997); 1997, pp. 412-420.

* cited by examiner

INCREMENTAL ANTI-SPAM LOOKUP AND UPDATE SERVICE

TECHNICAL FIELD

This invention is related to systems and methods for identifying both legitimate (e.g., good mail) and undesired information (e.g., junk mail), and more particularly to providing a near real-time or real-time update to an existing trained spam filter during message processing.

BACKGROUND OF THE INVENTION

The advent of global communications networks such as the Internet has presented commercial opportunities for reaching vast numbers of potential customers. Electronic messaging, and particularly electronic mail ("e-mail"), is becoming increasingly pervasive as a means for disseminating unwanted advertisements and promotions (also denoted as "spam") to network users.

The Radicati Group, Inc., a consulting and market research firm, estimates that as of August 2002, two billion junk e-mail messages are sent each day—this number is expected to triple every two years. Individuals and entities (e.g., businesses, government agencies) are becoming increasingly inconvenienced and oftentimes offended by junk messages. As such, junk e-mail is now or soon will become a major threat to trustworthy computing.

A key technique utilized to thwart junk e-mail or spam is employment of filtering systems and/or methodologies. However, spammers are continually changing their techniques in order to avoid filters. It is thus desirable to update filters quickly and automatically as spammer techniques change and to propagate them to end applications operated by messaging clients and/or servers.

For example, there can be approximately 100 million copies of messaging programs in use by clients. In addition, new spam filters can be created everyday. Because the spam filters can be rather large and distribution of them to each client operating a copy of the filter could be required everyday, such a practice can be problematic if not prohibitory on both the client and filter-provider sides. In particular, clients may be required to constantly download large files, hence consuming significant amounts of processor memory and decreasing processing speeds. Because the filter provider may have to update all copies of the filter for all users and/or clients everyday, an enormous and impracticable amount of bandwidth and servers may be required. Providing new filters more frequently than once a day can be nearly, if not completely, impossible under such conditions.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and/or methodology that facilitates providing spam filters with new information or data in the form of partial or incremental updates in a real-time or near real-time manner. Providing a near real-time mechanism by which a filter can be updated with the latest information can be one strategy to providing the most effective protection against incoming spam attacks.

In particular, the present invention involves communicating incremental portions of information to an existing filter to facilitate keeping the filter current with respect to new good messages and/or new spam. This can be accomplished in part by difference learning, whereby one or more parameters of the existing filter can be compared to those parameters on a new filter. The parameters which exhibit some amount of change can be updated accordingly, thereby mitigating the need to replace every copy of the entire filter. Hence, a "difference" between the existing filter and a new one can be sent to update the existing filter. As a result, each update can be relatively smaller in size and even more so, depending on the frequency of the updates. This is due in part to the fact that updated information is primarily based on new good messages or new spam; and there is only so much spam or good messages received per hour. Consequently, performing as many updates in any given time frame can become quite efficient and effective in the fight against spam.

According to one aspect of the invention, incremental updates can be determined in part by servers. The servers can decide which portions of their filters to update, obtain the updates, and then provide them to users or clients who have opted in or paid to receive them.

According to another aspect of the invention, incremental updates can be determined in part by a user or client via a web-based service. In particular, the client can receive a message that its current filter has difficulty in classifying as spam or good. The web-based service can provide a lookup table or database that includes data or other information about messages or features of messages that have recently been determined to indicate good messages or spam. By extracting some information from the message, the client can query the web-based service to determine if any updated information exists for its filter.

For example, a client receives a message and the client's filter experiences difficulty in classifying it as spam or good. The client can extract some part of the message such as the sender's IP address, a URL(s) in the message, or a hash of the message to request updated information from the web-based lookup service. In one instance, a query can be submitted to the web-based service. Alternatively or additionally, the client can reference one or more lookup tables or databases built and maintained with current information by the lookup service. When at least one update is found, the client's filter can be updated accordingly. If the service determines that the client requires a sequence of updates, the service can simply provide the most recent update to lessen the total number of updates required to be downloaded.

There can be thousands of different parameters that can be updated on any given spam filter. Due to the nature of these filters, one small change to one parameter value can cause some change to the values of nearly all of the parameters. Thus, there can be a variety of ways to determine what portions of a filter to update to provide the most effective spam protection. In one aspect of the present invention, the absolute values of changes to parameters can be examined. Parameters demonstrating the largest change in value can be selected to be updated. Alternatively, a threshold change amount (e.g., based on absolute values) can be set. Any parameters which exceed that threshold can be marked for updating. Other factors can be considered as well such as frequency of a parameter or feature in incoming messages.

In another aspect of the invention, incremental updates can be feature-specific and occur at a rate as desired by server or client preferences. Furthermore, filters can be built to minimize the number of parameter changes between an old and a new filter. Consequently, the overall size of any one filter update (e.g., data file) and the number of parameters to update can be substantially less than they would otherwise be.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
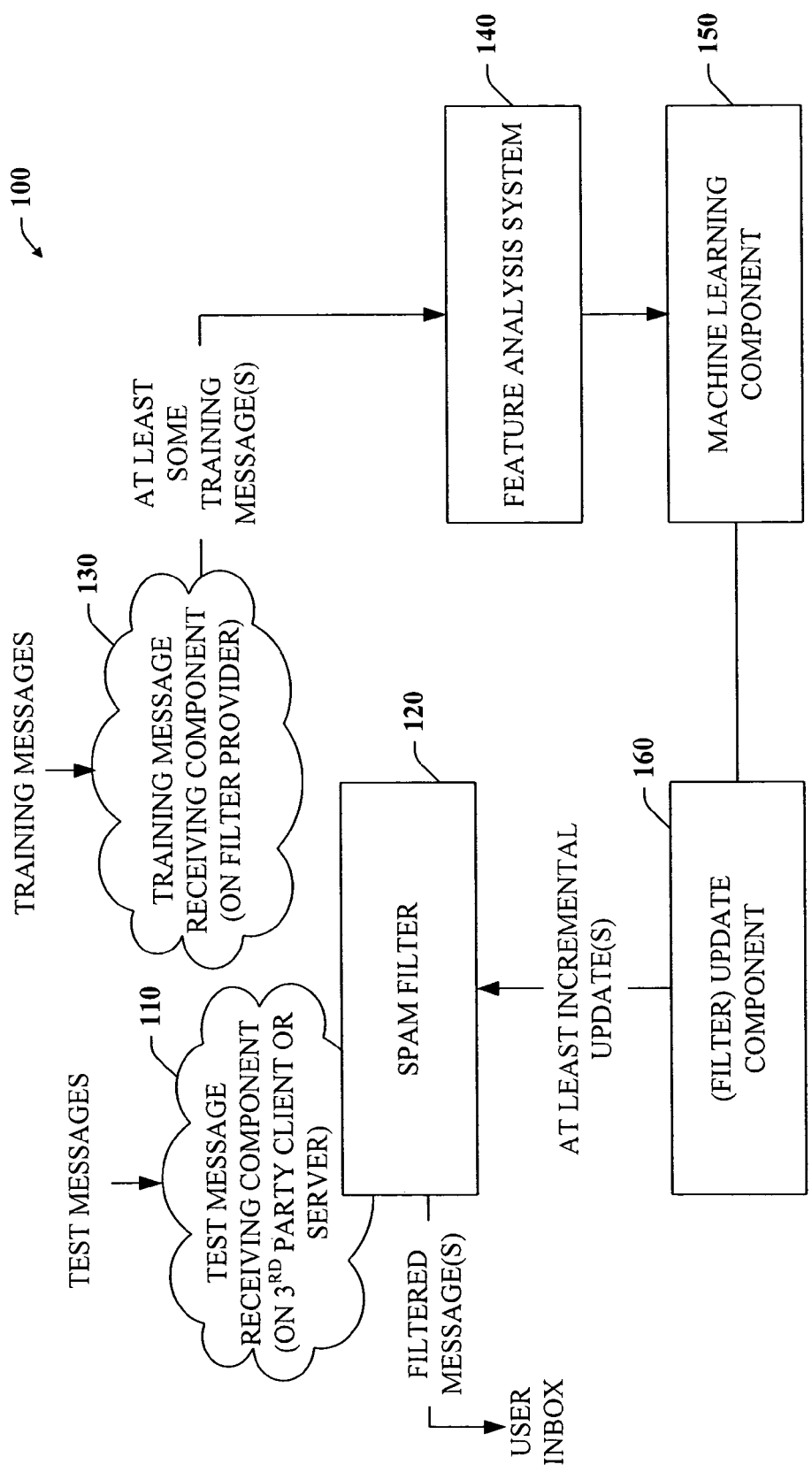
FIG. 1 is a block diagram of an anti-spam update system that facilitates providing machine-learned updates to spam filters in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with providing at least partial or incremental updates to machine learning or non-machine learning spam filters. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Various aspects of the present invention can be applied to machine learning and non-machine learning filters. In one common implementation, machine learning spam filters learn the definitions of what characterizes good messages and spam by using a machine learning algorithm to calculate the weights of individual characteristics that are extracted from messages. When a message is received by a host application, the message stream can be parsed and examined for features or characteristics that are weighted as spam or good message indicators. These weighted features are then combined to generate an overall probability that the message is or is not spam. If a message satisfies a specific "threshold" of probability, then the message can take an assigned course of action based on the host application settings. For example, good messages can be directed to the recipient's inbox while spam messages can be routed to a special folder or deleted.

Spammers are continuously adapting their methods. Through previous feedback loops and machine learning technologies, new filters can be automatically and readily produced. However, it can be equally important to efficiently propagate these new filters, to their users rapidly such as in real time or near real time. Propagation of the new filters can be broken down into two parts. The first involves size concerns. The propagated filter can be large and difficult to distribute easily as a whole. Fortunately, this can be overcome at least in part by sending a "difference" between the old filter and the new filter via a lookup system. As will be discussed below, the difference can be determined and/or based on a multitude of factors and/or preferences (client or server).

The second concern involves management of filter updates. On the one hand, many people may want all changes to the spam filter, including new code and new data, to automatically propagate. On the other hand, many administrators may want to install new files and/or data on test machines before automatically propagating to their whole organization. As discussed in the figures below, the need to propagate a large filter can be mitigated by delivering in memory only the differential features (weights) via an online lookup service.

Referring now to FIG. 1, there is a general block diagram of an anti-spam update system 100 that facilitates providing difference information to an old or existing spam filter in accordance with an aspect of the present invention. The system 100 comprises a testing message receiving component 110 that employs at least one spam filter 120 to classify incoming test messages as spam or good. The test message receiving component 110 can be located in a third party client or server (e.g., home computer). The spam filter 120 can be discriminatively trained using any one of SVMs (Support Vector Machines), maximum entropy models (logistic regression), perceptrons, decision trees, and/or neural networks.

The system 100 also comprises a training message receiving component 130 that can receive a variety of training messages. Examples include feedback loop data (e.g., data from users who participate in classifying (spam or good) at least a selected portion of incoming messages), user complaints, honeypot data, etc. The training message receiving component 130 can be found on the filter provider.

At least a portion of the incoming training messages can be routed to a feature analysis sub-system 140, whereby such messages can be parsed and examined for their spam-like and/or non-spam-like characteristics. In particular, a plurality of features such as IP address, URLs, and/or particular text can be extracted from each message and then analyzed. Using a machine learning component 150, an update component 160 can be trained, possibly using discriminative methods. Alternatively, the update component 160 can be trained using match or hash based data. The messages routed to the feature analysis sub-system 140 can be either unfiltered or filtered messages or a combination of both. Classifications of filtered messages as spam or good need not affect the training of the update component 160 or the production of updates for the spam filter 120.

The update component 160 comprises data such as weight values calculated for a plurality of messages and/or features such as words, lists of IP addresses, hostnames, URLs, and the like which can be extracted from the incoming messages. Such data can be organized into one or more data files or databases that are controlled by the update component 160.

When prompted by the message receiving/distribution system (e.g., one or more servers) 110, the update component 160 can at least incrementally augment at least a portion of the spam filter 120 with additional information. For instance, the update component 160 can update a data portion of the spam filter by adding new feature-weight data and/or by replacing old weight data with new weight data for any given feature. The update component 160 can also be customized to provide incremental updates, if available, on a timed or scheduled basis to minimize the relative size of any one update. The updates themselves can be generated on a timed basis as well or on the basis of number of incoming messages received. For example, updates can be created every hour and/or after every $30^{th}$ message is received.

Figure 2:
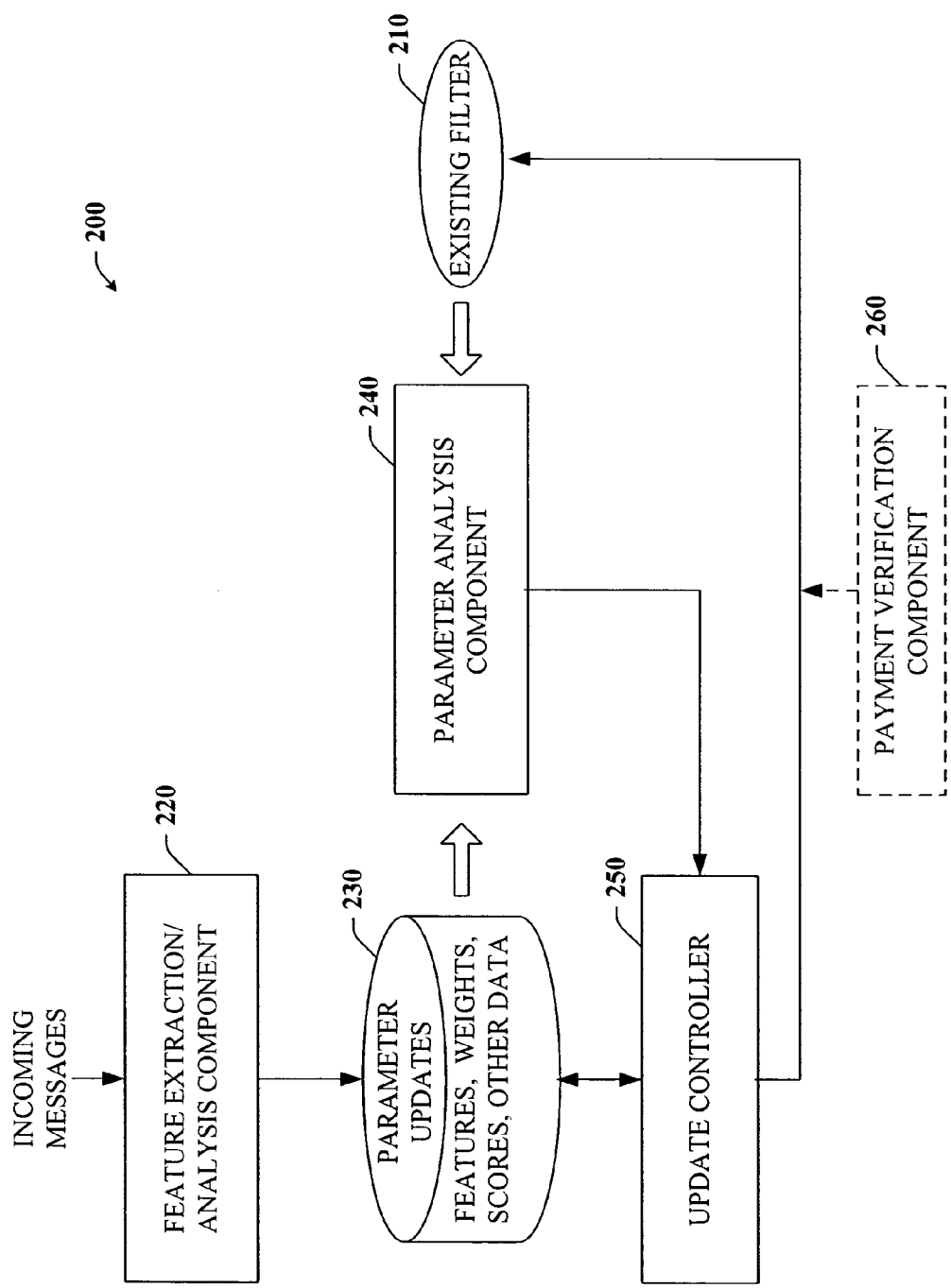
FIG. 2 is a schematic block diagram of an incremental update system in accordance with an aspect of the present invention.

Referring now to FIG. 2, there is illustrated a schematic block diagram of an anti-spam update system 200 that facilitates spam prevention. In general, the update system 200 compares new parameter data to old parameter data utilized by an existing spam filter 210. The system 200 comprises a feature extraction-analysis component 220 that can examine features extracted from incoming messages in order to identify relevant features (e.g., indicative of spam or good messages) and to ascertain their weights, scores, and other pertinent data. This data can be stored and maintained in a parameter update database 230. New parameter data in the database can be analyzed with respect to the old parameter data in the existing filter 210 by a parameter analysis component 240 to determine if any of the parameter data has changed.

For example, a parameter's weight can increase or decrease to indicate greater or lesser spam characteristics. In addition, parameters can be added to or deleted from the existing filter 210. In the latter case, a parameter or feature can be removed from the filter 210 when its weight falls to zero.

If it is determined that an update exists for any particular set or subset of parameters, such parameters can be communicated to an update controller 250. The update controller 250 can access the relevant parameter data from the database 230 and can then communicate such data to the existing filter 210. In essence, the system 200 provides an update service to spam filters to keep them current and effective against new forms of spam.

The update system 200 can run automatically on a client or on a server. Furthermore, the service can operate by subscription whereby a payment verification component 260 can determine whether a client or server has paid for the update or update service before any updates are provided. Alternatively, the filter 210 can verify that the subscription is current before allowing a lookup or update to occur.

The update lookup system (e.g., in FIGS. 1 and 2) can be a natural target for a denial-of-service (DOS) or distributed DOS attack. Thus, the system can be hardened against such attacks such as by distributing it across multiple IP addresses or multiple hostnames that correspond to different IP addresses. In practice, for example, different IP addresses can be distributed to different users (or clients or servers) to make it more difficult for an attacker to find the full list of IP addresses to attack.

With machine learning techniques, there can be thousands of different numeric parameters that can be updated since it is possible that substantially all of them can change at least by some small amount. As a result, determining what updates to make can be decided using several different approaches. For instance, one approach involves looking at the absolute values of parameters which have changed the most. However, the largest absolute value change may not be the most indicative of which parameters to update. This can be particularly true in cases where the parameter relates to a rarely observed feature. Therefore, other factors to consider when determining which parameters to update can include occurrence, frequency, or commonality of a parameter based on the most recent data. For example, if a parameter has changed by a lot but the corresponding feature occurs in very few messages (e.g., 3 out of every 100,000 messages on average), then sending an update for this feature may not be an efficient use of the update service.

Another approach involves looking at the absolute values of parameters which have changed by some amount that makes them important (e.g., by some minimum value or threshold), or for more common features, by some different minimum value than for less common features. If a particular threshold is satisfied, then parameter can be updated. Otherwise, it can remain the same.

Yet another approach involves building filters or updates to filters that attempt to limit the number of parameter changes. Some features referred to as counterbalancing features can interact with each other and ultimately affect the behavior of the filter. When counterbalancing features are not properly accounted for within the filter during training, the performance of the filter can be altered. Thus, building filters that limit the number of parameter changes can also mitigate the need to track whether counterbalancing features have been properly accounted for.

Figure 3:
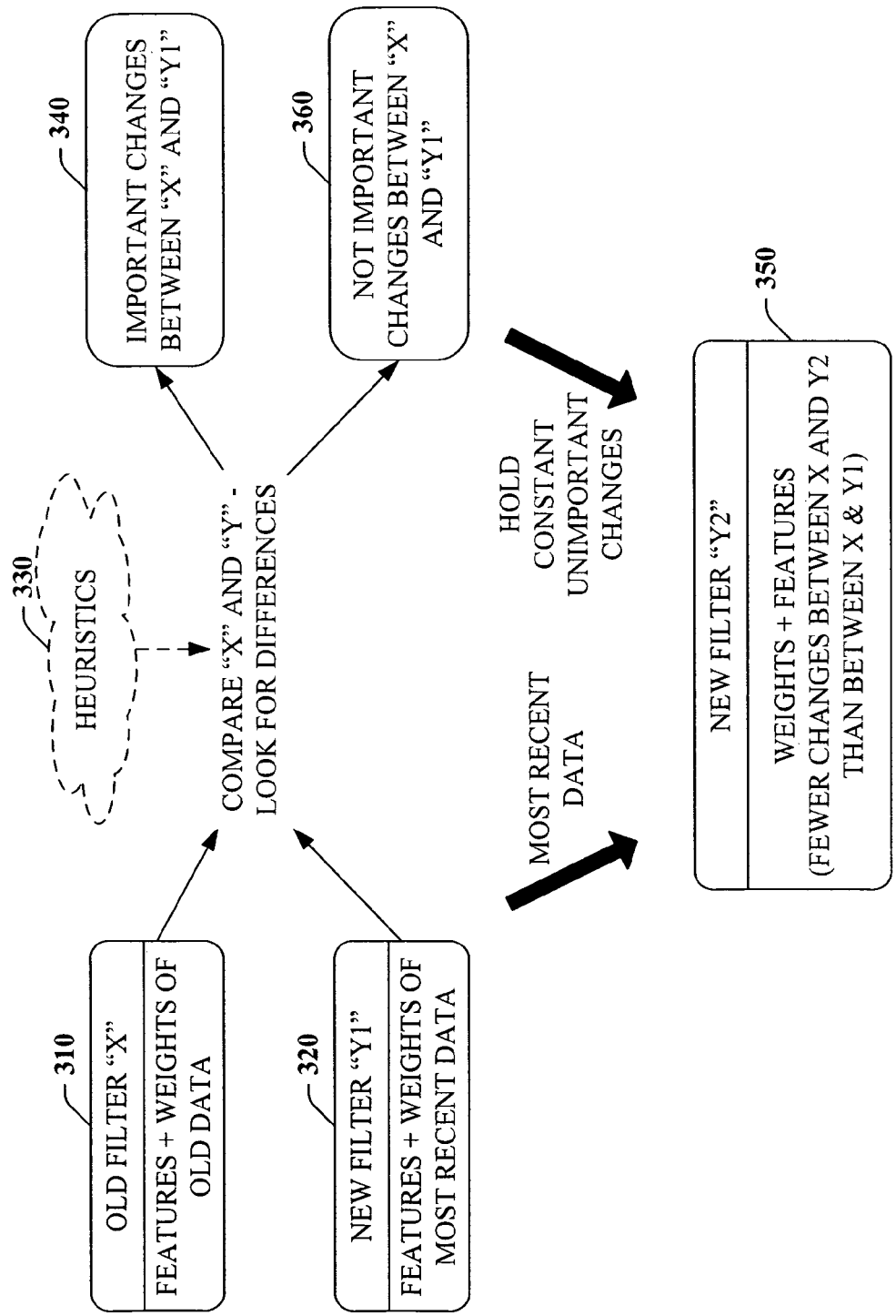
FIG. 3 is a schematic diagram demonstrating a system or mechanism for generating spam filters or updates thereto having a limited number of parameter changes in accordance with an aspect of the present invention.

For instance, imagine a filter A, currently in use, with, say, 0 weights for the word "wet" and a slight negative weight for the word "weather." Now, imagine that a large amount of spam arrives containing the word "wet" (but not weather.) Imagine that there is also a moderate amount of good mail containing the words "wet" and "weather" together. A new filter B can be learned that weights "wet" as heavily spam-like, and a counterbalancing negative (good) weight for "weather," such that when the words occur together, their weights cancel, and the mail is not classified as spam. Now, it can be possible to decide that the word "wet" in filter B, compared to filter A, is important enough to update the weight for (it occurred in a large amount of mail) but that the word weather is not (it occurred in a small amount of mail and changed by a smaller amount, since it already had a slight negative weight.) Thus, an update for "wet" can be propagated but not the counterbalancing update for "weather", leading to a large number of mistakes. To mitigate the creation of such undesirable updates, filters that minimize the number of parameter changes can be constructed, as illustrated in FIG. 3.

According to the figure, begin with an old filter X 310 comprising features and weights of old data. Now, train using machine learning a new filter Y1 320. Find the differences between X 310 and Y1 320 that are important according to some heuristic(s) 330. For instance, one could measure the absolute value of the difference; the information gain from the difference; the absolute value of the difference times the frequency of use of the parameter; etc. In the case of a linear model (e.g., an SVM model, a Naïve-Bayes model, a perceptron model, a maxent or logistic regression model), a model consists of weights for features (e.g., words in the message). Regarding a linear model, this consists of finding those feature weights that have changed the most according to one of these measures (340).

Following, a new filter Y2 350 can be learned subject to the constraint that all differences between the filters that were small (or not important enough 360) must have the same value in Y2 350 as they had in X 310. For instance, for a linear model, this means that the weights for features that have not changed much are the same in Y2 350 and in X 310. However, for features that have changed a lot (e.g., satisfied some threshold or heuristic), the weights are different in Y2 350. Referring to the previous "wet" and "weather" example, when "wet" is learned to be bad, it cannot be learned as too bad of a term because its counterbalancing weight ("weather") will be fixed. Thus, there is no longer a need to otherwise track if counterbalancing features are accounted for.

Optionally, this procedure can be iterated, finding only those features whose weight is consistently different. For example, since the "weather" parameter value cannot be changed, it can be decided to not change the "wet" parameter value.

Moreover, the filter(s) can be updated using the update to Y2 350 instead of the update using Y1 320. The difference between Y2 350 and X 310 is smaller than the difference between Y1 320 and X 310 because many parts of the model were constrained to be the same.

An alternative technique is to update only one part of the data such as a portion that changes more quickly or has a larger impact on the model. For instance, IP address and URL data may change more quickly (or more slowly) than text data. In addition, it may be easy to train these features independently of other features (see e.g., U.S. application Ser. No. 10/809,163 entitled Training Filters for IP Address and URL Learning and filed on Mar. 25, 2004). Thus, a model can be built that can hold some set of features constant while allowing others to change.

Moreover, by selectively updating a subset of features (e.g., at least one independent of any others), future updates to the model can be accomplished with even greater ease. One example of this kind of model is a decision tree model where each leaf comprises an independent model that can be updated separately from the models at the other leaves. Research has found that these models can have the same number of features as a typical model that is currently built but with better performance overall.

There are other ways that a model could be designed a priori to have feature subsets that do not or are not allowed to balance weights between them during the model building, including dividing the feature space arbitrarily by clustering the features into groups that are related or by some other mechanism. Alternatively, as in decision trees, the messages can be divided by, for example, clustering them into related groups (in which case, as in the case of decision trees, there can be duplicated features in different clusters with different weights, but they can be updated independently).

Incremental updates can also be determined at least in part by the distribution of messages that the client, server, or user receives—with the updated features focused first on those that apply to messages that the particular customer (server or client) receives the most. Hence, a plurality of clients, for example, can receive different updates to their filters according to the types of messages they receive.

Once the types of updates are determined, managing the updates of a spam filter can be challenging. Message system administrators are often or sometimes interested in knowing what software, including data files, their users are using. In some cases, administrators may even want all their users running the same data or alternatively, they may not want to distribute new data files before they have had an opportunity to test them in a favorite or desirable environment. Hence, they may not want users to directly communicate with an update service.

For example, in one scenario, administrators can prefer to download particular files first and test them out for operability, conflicts with other system files, etc . . . before sending them to the users. It is thus desirable to facilitate a two stage propagation in which updates to data or code are first sent to the administrator and then propagated to the users. In some cases, administrators can already trust the filter provider and may prefer a fully automatic lookup process without verification.

It should be understood that this lookup or update service can require code for operation on an email client or on a server. Furthermore, lookups or updates can be performed at scheduled intervals which may be specified by the end user or administrator. Alternatively, lookups or updates can be performed when certain events occur, such as when a messaging program is started or opened. When an update is available, the end user or administrator can be notified (e.g., update is optional), or the update can be automatic. The end user or administrator can be given the choice between these options. Finally, updates to the spam filter can occur and take effect immediately even without restarting the messaging program.

As discussed, updates to spam filters can be at least incremental whereby the most useful or desired portions of the spam filter are updated and the remaining portions are kept constant to minimize the size of the updates and related data files associated therewith. In most cases, servers are responsible for determining which updates to make, when to make such updates, and/or the manner of making such updates. Unfortunately, servers can be slow in making such determinations or the timing or content of such updates can be slightly misaligned with a client or user's filtering needs. Either case can be problematic for clients particularly when an existing spam filter is uncertain about the classification of a particular message(s) and the client cannot sustain further delays by waiting for a server-prompted update.

Figure 4:
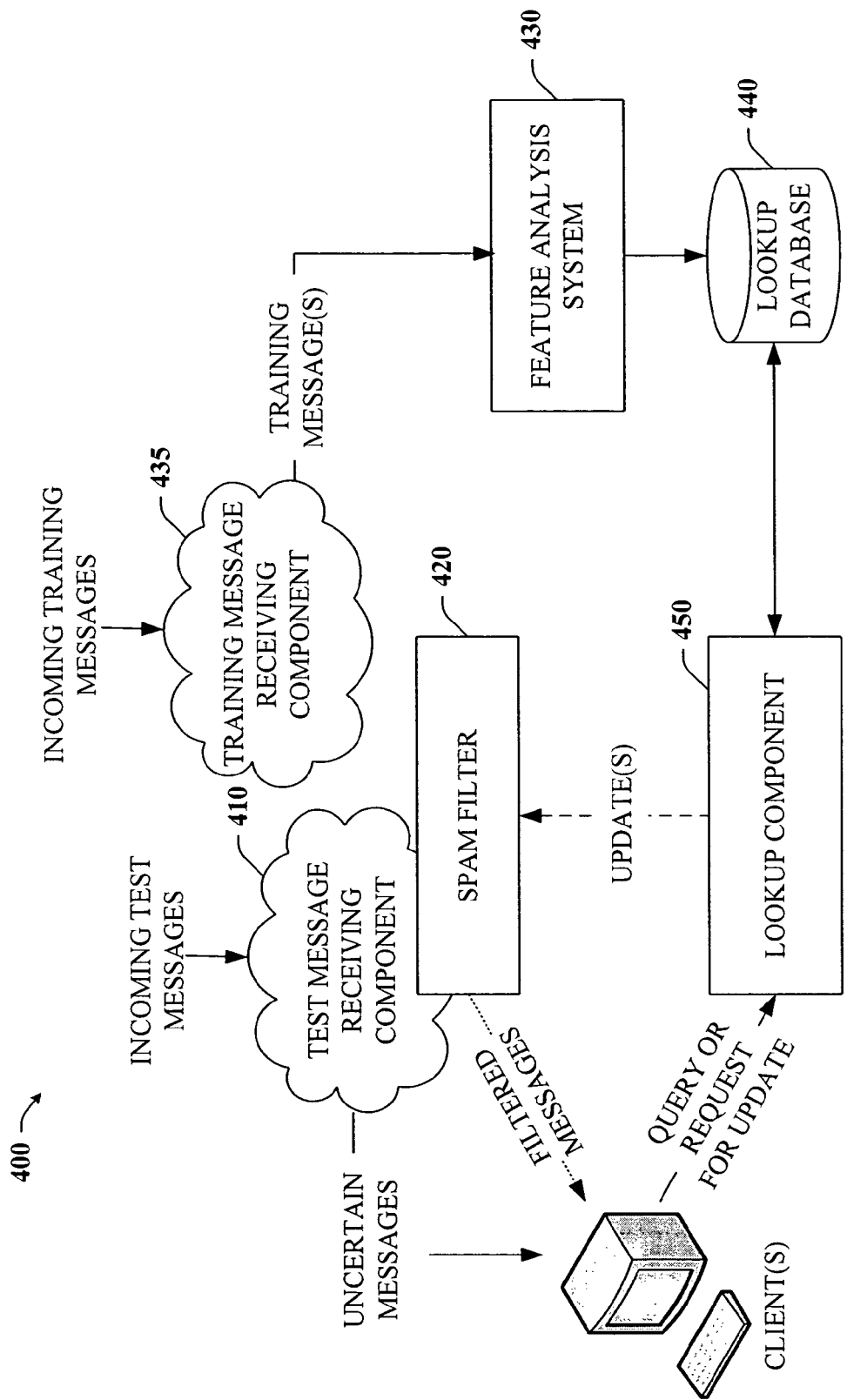
FIG. 4 is a block diagram of an anti-spam update system based at least in part upon client requests in accordance with an aspect of the present invention.

In FIG. 4, there is depicted a schematic block diagram of a lookup service system 400 that allows for updating spam filters during their use by clients. The lookup service system 400 can be similar to the update system 100 in FIG. 1, supra, particularly with respect to generating some type of update data for near real time or real time propagation to the spam filter. In addition, however, the lookup service system 400 can provide updates to the spam filter by request by a client or end user rather than by server instructions alone.

According to the figure, incoming test messages can be delivered to a test message receiving component 410 that employs at least one spam filter 420 to facilitate classifying messages as spam or not spam. The test messages can assist in determining the accuracy of the spam filter 420 given its current set of parameters. The test message receiving component 410 can be located on a third party server or client. The spam filter 420 can be either machine learning trained or non-machine learning trained.

Update learning can be performed as follows: at least a portion of incoming training messages can be routed to a feature analysis system 430 by way of a training message receiving component (located on a filter provider) 435. The feature analysis system 430 can generate recent data based on features and their respective weights extracted from at least a portion of the training messages and store them in a lookup database 440.

Because spammers continue to adapt and/or modify their spam, there can be a portion of messages that cannot be classified as spam or good by the existing spam filter 420. The client can mark such messages and then send a query or request to a lookup component 450 based on the message, a hash of the message, and/or on one or more features of the message.

If any data from the lookup database satisfies the request, then such corresponding information can be sent or downloaded to update the spam filter 420. Afterward, an updated spam filter can be applied to the uncertain messages as well as to any new messages to facilitate the classification process.

Figure 5:
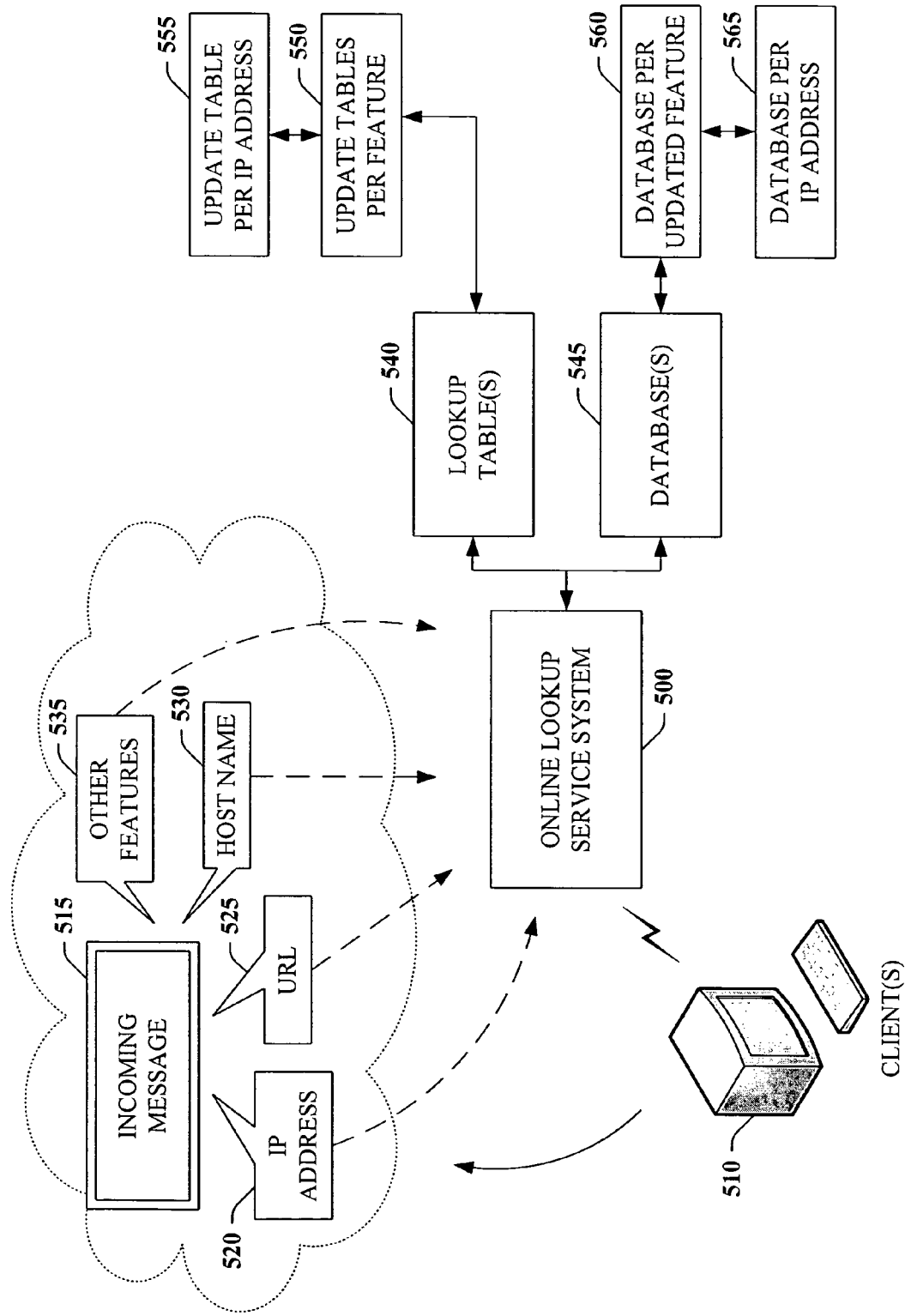
FIG. 5 is a block diagram of an anti-spam update system based at least in part upon client requests in accordance with an aspect of the present invention.

Turning now to FIG. 5, there is illustrated a schematic diagram of an online lookup system 500 that facilitates a web-based update service as employed by a client 510. Imagine that an existing spam filter which has been trained on "old" data is being used to classify incoming messages 515. Unfortunately, the client's existing filter is experiencing some difficulty in determining whether some messages are spam or good. Rather than quarantining the messages 515 or waiting for a server-prompted update to arrive, the client 510 can take the message 515 or some feature extracted therefrom such as an IP address 520, URL 525, hostname 530, or any other feature(s) 535 and query the online lookup system 500. The online lookup system 500 can comprise one or more lookup tables 540 and/or one or more databases 545. The lookup tables 540 can include updated data per feature 550—such as per IP address 555. If the client performs a query on the IP address of the message, then that IP address can be looked up in the appropriate lookup or update tables.

Similarly, the databases 545 can be referenced or searched for any updates pertaining to the IP address 520. The databases 545 can be arranged per updated feature 560 as well—such as per IP address 565. To regulate table or database sizes, only features with updated information can be provided in the lookup tables and databases, respectively. However, lookup tables and/or databases having substantially all features or parameters regardless of whether their weight or value has changed can be available as well. Regardless of the table or database arrangement, if an update is found, it can be sent directly to or downloaded by the client to update the spam filter. Thus, updates to the spam filter can be based on client preferences and can occur as needed.

If the messaging system on the server or client has not received all previous updates, it may be necessary to lookup more than one series of features or updates. The system can perform a lookup since the last recorded lookup and then can apply them in order. Optionally, the update server can merge multiple lookup files together, to improve the efficiency of the download. Finally, the update may also occur over a secure channel, such as HTTPS.

The incremental lookups for newer data may be written to file or may be stored on disk and then combined in memory. In addition, the incremental updates can specify that a certain part, feature(s), or parameter(s) of the model is no longer needed (e.g., weight is zero), thus allowing them to be deleted and saving memory or disk space.

Figure 6:
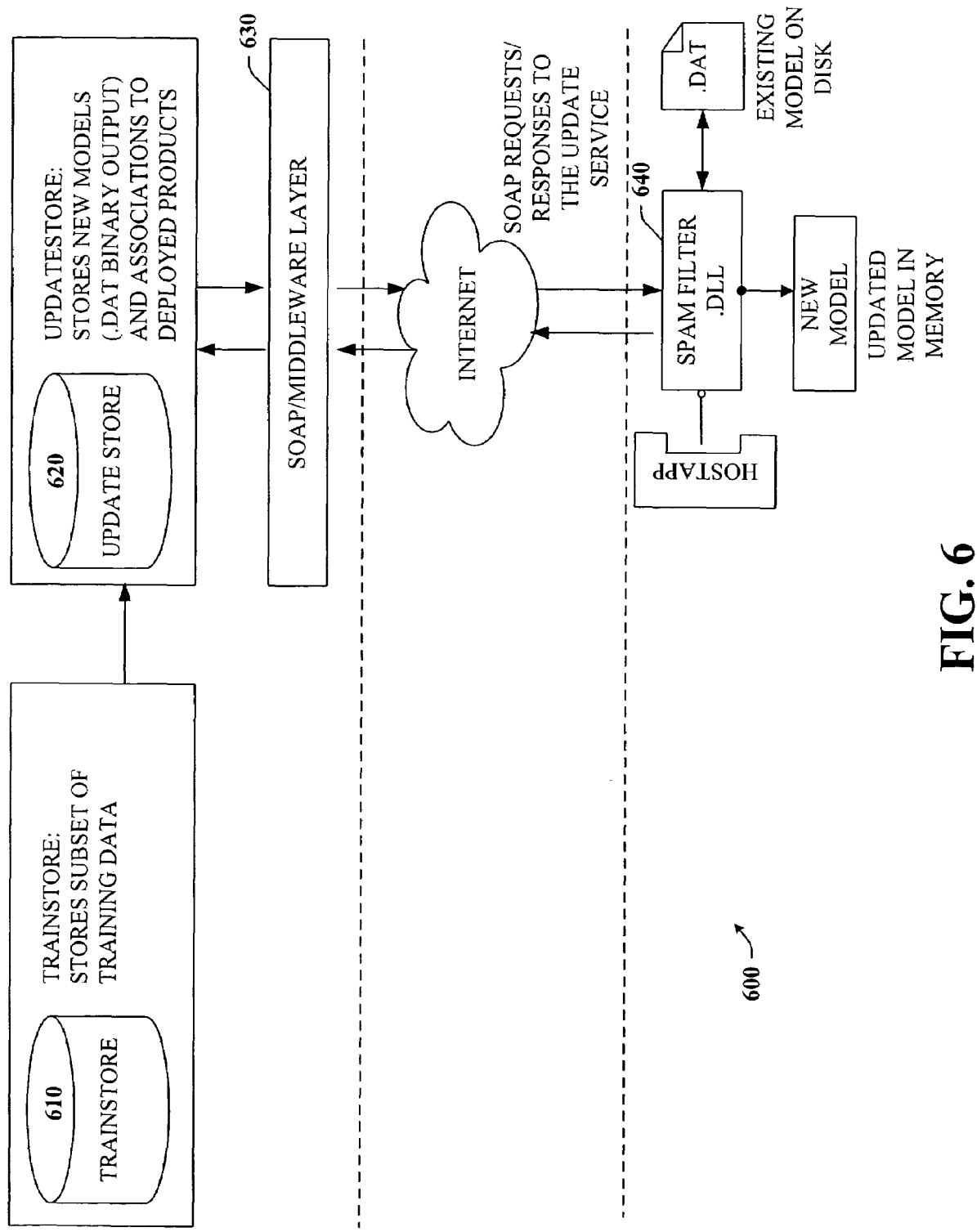
FIG. 6 is a schematic diagram of an exemplary anti-spam lookup web service in accordance with an aspect of the present invention.

Referring now to FIG. 6, there is illustrated an exemplary architecture 600 of an anti-spam lookup web-based service in accordance with an aspect of the present invention. The architecture 600 comprises multiple layers such as, for example, a data-tier layer (or back-end database) that houses a subset of features and associated weights and models that are generated during training; a middle-ware layer that passes communication between the database and the spam filter; and the spam filter which calls the middle-ware layer at a pre-defined or automatic frequency to get the latest updated model and merges the online model with the locally stored model file.

More specifically, the data-tier layer houses two stores: a copy of the TrainStore 610 (used for standard training) and an UpdateStore 620. These stores can be a flat file or a database. The dedicated TrainStore 610 optionally houses only the features and weights for a subset of features that benefit from frequent updating. The UpdateStore 620 is a new database or set of flat files that include the model output in binary form which results from the subset of information from the dedicated TrainStore 610, as well as a few new variables for deployed product association. This subset of information can include:

New models containing features that benefit greatly from more frequent updating;

Examples of these include URL features, IP features, and new special features;

Relationship of new probabilistic models respective to earlier versions of deployed model files; and/or Incremental updates of new models to minimize size of new model transfer.

The middle-ware layer 630 can act as the interface between the UpdateStore 620 and the Spam Filter .dll file 640. It exposes the web-service interfaces and functionality that pass information back and forth between the spam filter and the online lookup service. It may be a SOAP service, HTTP service, HTTPS service, or other internet service.

The anti-spam lookup service is particularly powerful when combined with certain other spam-related systems and methods. In particular, it can be particularly powerful when combined with message quarantining. In message quarantining, some messages are put into the junk folder or a quarantine folder, or otherwise held aside temporarily. They are then rescored after a spam filter update. Techniques such as "report junk buttons" in which users report junk messages to a central repository also can yield important data for spam filters updates. Additionally, techniques such as honeypots in which data sent to certain accounts that should never receive messages (e.g., newly created unused accounts) are a valuable source for spam filter updates. Furthermore, in a feedback loop, users are polled as to whether certain messages are good or spam. This provides valuable data for updating a spam filter. Because the data is relatively unbiased, it can be more useful than report-junk or honeypot data.

Various methodologies in accordance with the subject invention will now be described via a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 7:
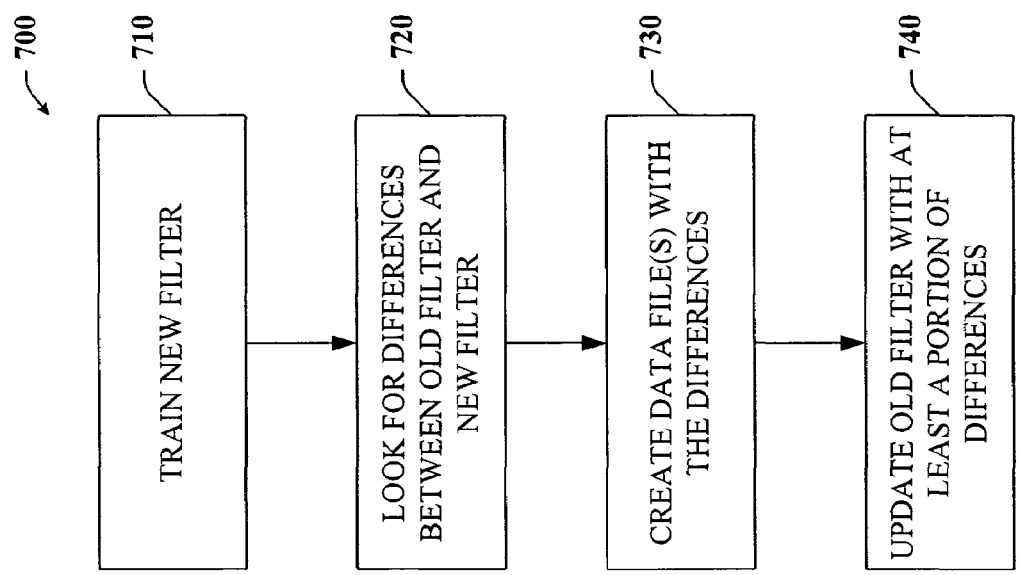
FIG. 7 is a flow chart illustrating an exemplary methodology that facilitates updating spam filters at least incrementally in accordance with an aspect of the present invention.

Referring now to FIG. 7, there is a flow diagram of an exemplary spam filter update process 700 that facilitates at least near real time updates to spam filters during use. The process 700 involves training a new filter at 710 with new or more recent data (messages) such as by machine learning techniques. The new filter can be discriminatively trained on a plurality of message features and their associated weights. A few examples of features include any IP addresses, URLs, hostnames or any words or text that can be extracted from a message.

At 720, the process 700 can look for differences between the new filter and the old filter (trained on old data). Any differences that are found or detected can be stored as one or more separate data files at 730.

Optionally, the data files can be stored in databases and/or the content included therein can be arranged into one or more lookup tables. These data files can be made available to clients via a web-based lookup service. Though not depicted in the figure, clients can query the lookup service to determine if particular updates are available—for any message or features from a message that cannot be classified using their existing spam filter. If updates are available, the client can select the ones he wishes to download to partially or incrementally update the existing spam filter.

Referring again to FIG. 7, the old spam filter can be updated with one or more data files at 740. Thus, the old filter is incrementally updated with data that has demonstrated a sufficient amount of change as opposed to replacing the old filter with an entirely new filter.

In practice, for example, the absolute values of parameters can be compared between the old and new filters. A change threshold can be set. When the absolute value change of any parameter satisfies the threshold, then such a change can be saved to an update component or data file. Other factors such as the frequency of the parameters in messages can influence whether a particular "change" is included in an update. Updates can be stored as data files, can be arranged into lookup tables, and/or can be saved to searchable databases.

Furthermore, update requests can be made by servers and/or by individual clients. For example, server administrators can examine incoming messages and the filtering thereof and determine that particular updates are needed based on various factors, such as, observing an increased number of user complaints about certain messages and/or an increase in the number or similarity of messages in quarantine. To address these areas of concern, servers can request at least partially incremental filter updates. Consequently, these updates would be applied on the server side and then onto to individual clients.

Conversely, clients can directly request and even access incremental update data. With a particular questionable message or features from a questionable message in hand, a client can query by way of an online lookup table or database whether this particular message or features from the message have any updates corresponding thereto. The pertinent updates, if any, can then be downloaded to the client and applied to the client's filter. The server or its spam filters are not affected by the updates. Thus, clients are able to customize or personalize the content of updates to their spam filters based at least in part on the specific types of messages they are receiving. In addition, querying the update or lookup system for more recent data can be faster than waiting through a quarantine process. Moreover, the old filter can be updated partially incrementally and/or partially by a lookup service/system.

Figure 8:
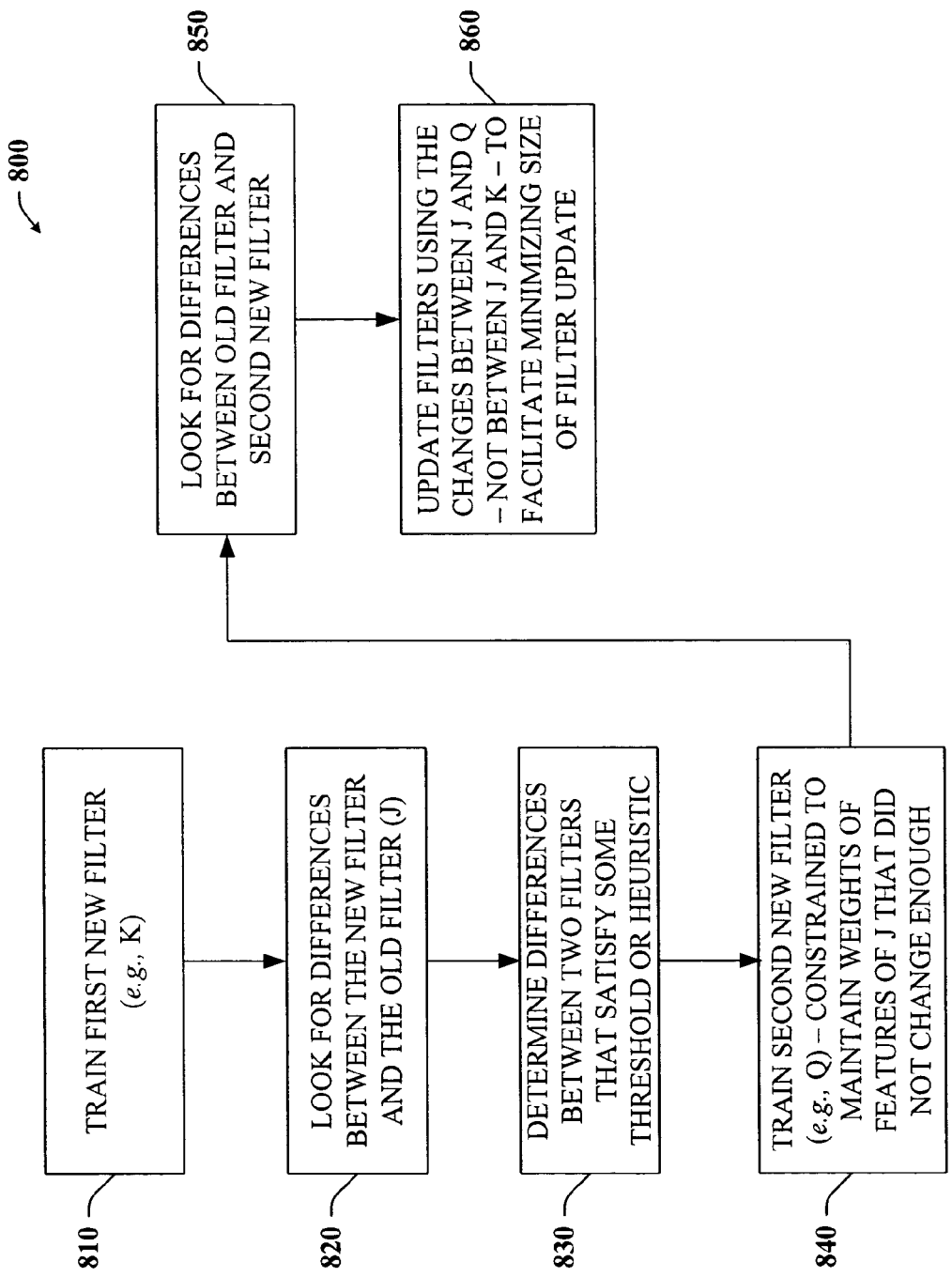
FIG. 8 is a flow chart illustrating an exemplary methodology that facilitates generating filters exhibiting a smallest amount of updates or changes from a previous filter in accordance with an aspect of the present invention.

Spam filters can train thousands of parameters—each parameter having a value associated therewith. A small change to one parameter can cause at least small changes in all of the other parameters. Thus, to some extent, it is possible to have a large number of "differences" or changes among parameters. To minimize the number of changes and the overall size of a filter update, an exemplary process 800 as demonstrated in FIG. 8 can be employed. As a result of the process 800, updates to filters can focus on the more significant and meaningful changes between old and new data.

As illustrated in the figure, a first new filter (e.g., filter K) can be trained at 810 using data extracted from new or recently received messages. Machine learning techniques can be employed for such training. At 820, differences between the new filter K and the old or existing filter (that is currently in use) can be isolated based at least in part on one or more heuristics, for example. For instance, feature weights can be compared and the absolute value of the difference can be determined at 830. The frequency of the changed feature or parameter in messages can also be considered. Many other heuristics can be employed as well. Additionally, one or more threshold values can be configured and then compared to the absolute values of the differences. The threshold values can also be determined per feature(s) to account for frequency or occurrence rates of various features in good and/or spam messages. For example, a lower threshold value can be set for features which rarely occur in either good or bad messages.

At 840, a second new filter (e.g., filter Q) can be trained subject to the constraint that all of the differences between the filters J and K that were small (or not large enough to satisfy the thresholds or heuristics) can have the same value as they did in filter J. Thus, the weights for these particular features can be held constant in the second new filter. At 850, differences between the old filter J and the second new filter Q can be found. Those differences which satisfy one or more thresholds or heuristics can be stored in an update data file. Because many of the features in the second new filter Q are constrained to have the same values as in the old filter J, a smaller number of changes will be evident between the two filters. Consequently, the filter update is smaller. The old filter J can then be updated at 860.

Alternatively, a portion of the old filter data can be updated. For example, only IP address or URL data can be examined and updated—independent of any text-related features. In general, updates can be applied in sequential order particularly in situations where a server or client has not connected to the internet for some time and now needs multiple updates. Each update can be downloaded and then applied in order. Conversely, the necessary updates can be analyzed and then merged to decrease the overall size of the update. For instance, a weight may have changed several times since the server's last update. Instead of updating the filter with each change to the weight, the last and most recent weight value can be applied and the other "intermediate" values can be ignored. Hence, smaller or fewer updates result.

The storage of incremental updates can be flexible depending on particular servers or clients. For example, updates can be stored in a separate file and then merged with an original (filter) file. However, update files can be discarded soon after they are utilized. Therefore, a base filter file can be maintained and then the most recent differences can be ascertained on the fly. At times, some features can eventually end up with a 0 weight. These features can be deleted from the filter to save space.

Figure 9:
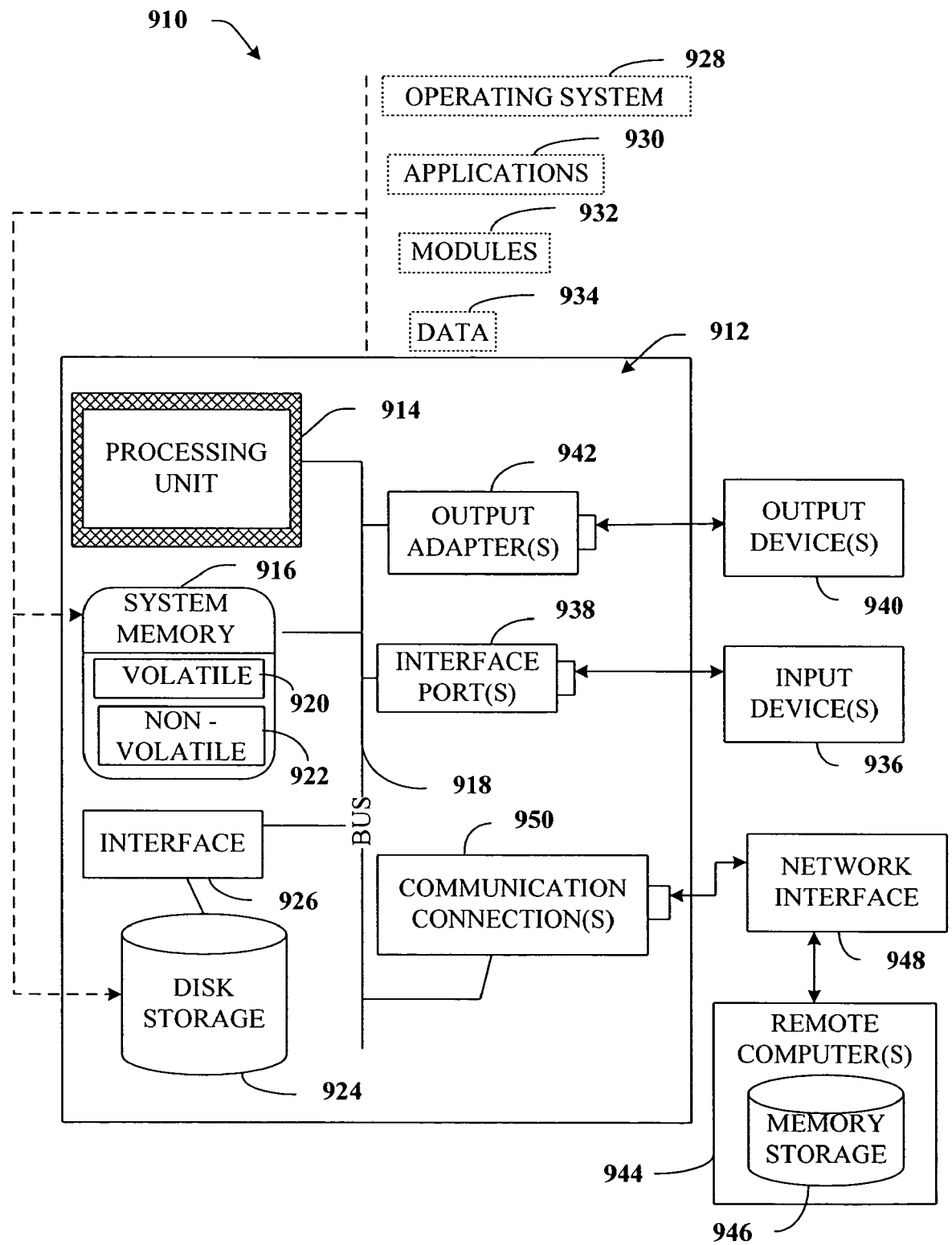
FIG. 9 illustrates an exemplary environment for implementing various aspects of the invention.

In order to provide additional context for various aspects of the present invention, FIG. 9 and the following discussion are intended to provide a brief, general description of a suitable operating environment 910 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented anti-spam update system comprising following components stored in a computer memory:
a spam filter trained to distinguish between spam and good messages;
an update component that incrementally augments or replaces at least a portion of the spam filter with updated information to facilitate spam prevention, the update component is built at least in part by using a machine learning component; and
the machine learning component trains a first new filter using data extracted from one or more newly received messages, determines differences between the first new filter and the spam filter that satisfy a threshold value, trains a second new filter constrained to maintain weights of features of the spam filter corresponding to differences between the first new filter and the spam filter that did not satisfy the threshold value, and determines differences between the spam filter and the second new filter which satisfy one or more thresholds for augmenting or replacing at least a portion of the spam filter, wherein the updated information utilized by the update component is based at least in part on the determined differences between the spam filter and the second new filter.

2. The system of claim 1, the update component updates at least a data portion of the spam filter.

3. The system of claim 1 runs on at least one of a client or a server.

4. The system of claim 1, the update component is trained using match- or hash-based data.

5. The system of claim 1, further comprising a payment verification component that determines whether a client or server has paid to receive updates before one or more updates are provided to the spam filter.

6. The system of claim 1, the update component provides the updated information to the spam filter via a plurality of IP addresses to mitigate denial-of-service attacks.

7. The system of claim 1, the updated information comprises one or more incremental update files corresponding to one or more parameter changes.

8. The system of claim 1, the at least a portion of the spam filter comprises data specific to at least one feature.

9. The system of claim 8, the at least one feature comprises at least one of an IP address and a URL.

10. The system of claim 1, further comprising a component that builds machine learning spam filters to lessen a number of parameter changes between an existing spam filter and a new filter to facilitate minimizing incremental update sizes.

11. The system of claim 1, the update component sequentially applies a plurality of different updates to the spam filter.

12. The system of claim 1, the update component merges at least a subset of a plurality of updates to improve download efficiency of the updated information.

13. The system of claim 1, the update component selectively provides feature-specific updates in an independent manner such that at least one feature is updated independently of at least one other feature.

14. The system of claim 1, the spam filter comprises a plurality of sub-filters that are trained or updated independently of each other and is decomposable as a result.

15. The system of claim 1, further comprising a quarantining component that delays classification of at least a subset of messages until the spam filter receives the updated information from the update component.

16. A computer-implemented anti-spam query system comprising following components stored in a computer memory:
a machine learning spam filter trained to distinguish between spam and good messages;
a lookup component that receives queries for feature-related information as a message arrives to facilitate updating the spam filter, the lookup component is built at least in part by using a lookup database; and
the lookup database trains a first new filter using one or more features extracted from one or more recently received messages, determines differences between the first new filter and the spam filter that satisfy a threshold value, trains a second new filter constrained to maintain weights of features of the spam filter that did not satisfy the threshold value, and determines differences between the spam filter and the second new filter which satisfy one or more thresholds for augmenting or replacing at least a portion of the spam filter, wherein the lookup component updates the spam filter based at least in part on the determined differences between the spam filter and the second new filter.

17. The system of claim 16, the feature-related information comprises positive and negative data for a plurality of features or messages.

18. The system of claim 16, the feature-related information comprises feature scores and reputation scores for a plurality of features including at least one of IP addresses, URLs, hostnames, character strings, and words.

19. The system of claim 16, the spam filter is discriminatively trained.

20. The system of claim 16, the spam filter is updated at least partially incrementally.

21. The system of claim 16, the spam filter is updated at least partially by the lookup component.

22. The system of claim 16, the lookup component writes incremental lookup queries to file or stores them on disk and combines them in memory.

23. The system of claim 16, the lookup component comprises:
- a back-end database that comprises a set of features and associated weights and one or more models or filters that are generated during training;
- a middle-ware layer that passes communication between the database and a spam filter; and
- the spam filter which calls the middle-ware layer at predefined or automatic frequency to obtain the most recent updated model and merges an online model with a locally stored model file.

24. The system of claim 16, the queries comprise requests for incremental updates of information for the spam filter from at least one of a client or a server.

25. The system of claim 16, further comprising an updated spam filter that is propagated from a service provider to an end user in at least two stages, wherein at least one of the stages is automatic such that there is an option for human intervention between the two stages.

26. The system of claim 16, further comprising a component that propagates filter code automatically from the service provider to the end user.

27. The system of claim 16, queries are sent to the lookup component at specified intervals according to an end user or administrator preferences.

28. The system of claim 16, updates to the spam filter take effect without restarting a messaging program.

29. A computer-implemented anti-spam update method comprising the following operations to build filters which minimize a number of differences:
- providing an existing trained spam filter stored in a computer memory;
- discriminatively training a first new spam filter using machine learning and data from one or more new messages;
- determining a first set of differences between the existing spam filter and the first new spam filter that satisfy a threshold or heuristic;
- training a second new spam filter using the new message data subject to a constraint that parameter changes between the first new spam filter and the existing spam filter that did not satisfy the threshold or heuristic have same value in the second new filter and the existing filter;
- determining a second set of differences between the second new spam filter and the existing spam filter; and
- incrementally updating the existing spam filter with at least a subset of the second set of the differences.

30. The update service of claim 29, the existing spam filter is trained using machine learning.

31. The update service of claim 29, the existing spam filter is currently in use by a messaging program to classify messages as spam or good.

32. The update service of claim 29, the new spam filter is trained on more recent or new data.

33. The update service of claim 29, the differences comprise one or more parameter changes between the existing spam filter and the new spam filter.

34. The update service of claim 29 is a web-based service.

35. The update service of claim 29, further comprising requesting feature-specific updates to the existing spam filter at least in part by searching at least one of lookup tables and databases.

36. The update service of claim 35, the lookup tables and databases comprising a plurality of incremental updates corresponding to a plurality of features.

37. The update service of claim 29, wherein incrementally updating the existing spam filter is based at least in part by the distribution of messages that any one of a client, server, or user receives.

38. The update service of claim 29, wherein one or more incremental updates to the existing spam filter are feature-specific such that at least one feature is updated independently of another feature.

39. A computer-implemented anti-spam update system comprising following components stored in a computer memory:
- means for providing an existing trained spam filter;
- means for discriminatively training a first new spam filter using machine learning and new data;
- means for determining a first set of differences between the existing spam filter and the first new spam filter that satisfy a threshold or heuristic;
- means for training a second new spam filter using the new data subject to a constraint that parameter changes between the first new spam filter and the existing spam filter that did not satisfy the threshold or heuristic have same values in the second filter as they do in the existing filter;
- means for determining a second set of differences between the second new spam filter and the existing spam filter; and
- means for incrementally updating the existing spam filter with at least a subset of the second set of the differences.

40. The update system of claim 39, further comprising a means for requesting feature-specific updates to the existing spam filter at least in part by searching at least one of lookup tables and databases.

41. A computer readable medium having stored thereon computer-executable code for facilitating incremental updates to spam filters comprising:
- code for obtaining information associated with a first set of differences resulting from comparing an existing spam filter to a first newly trained spam filter;
- code for comparing absolute values of the first set of differences to one or more threshold values;
- code for training a second newly trained spam filter such that elements of the second newly trained spam filter respectively corresponding to differences in the first set of differences having absolute values less than the threshold values are unchanged from the existing filter;
- code for obtaining information regarding a second set of differences associated with comparing the existing filter and the second newly trained filter; and
- code for updating the existing filter based on the second set of differences.

* * * * *

UNITED STATES PATENT AND TRADEMARK OFFICE
CERTIFICATE OF CORRECTION

PATENT NO. : 7,664,819 B2
APPLICATION NO. : 10/879626
DATED : February 16, 2010
INVENTOR(S) : Murphy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1417 days.

Signed and Sealed this

Seventh Day of December, 2010

David J. Kappos
*Director of the United States Patent and Trademark Office*